United States Patent [19]

Tanaka et al.

[11] 4,077,923

[45] Mar. 7, 1978

[54] METHOD OF MANUFACTURING CATION EXCHANGER

[75] Inventors: Kiichi Tanaka, Kamifukuoka; Noboru Gomyo, Chofu; Kayoko Usui; Yasuyo Takahata, both of Tokyo; Masaaki Tamayama, Hachioji, all of Japan

[73] Assignee: Nittan Company, Limited, Tokyo, Japan

[21] Appl. No.: 635,219

[22] Filed: Nov. 25, 1975

Related U.S. Application Data

[63] Continuation of Ser. No. 482,207, Jul. 24, 1974, abandoned.

[51] Int. Cl.² ............................................. C08J 11/04
[52] U.S. Cl. ................. 260/2.3; 260/2.2 R; 260/711; 260/720
[58] Field of Search .................. 260/2.3, 2.2 R, 716

[56] References Cited

U.S. PATENT DOCUMENTS

| | | | |
|---|---|---|---|
| 1,807,930 | 6/1931 | Omansky | 260/711 |
| 2,208,441 | 7/1940 | Winkelmann | 260/711 |
| 2,333,142 | 11/1943 | Behrman | 260/2.2 R X |
| 2,597,438 | 5/1952 | Bodamer | 260/2.2 R X |
| 2,681,330 | 6/1954 | Bodamer | 260/2.2 R X |
| 3,086,947 | 4/1963 | Kuwata et al. | 260/2.2 R |
| 3,577,357 | 5/1971 | Winkler | 260/2.2 R |

FOREIGN PATENT DOCUMENTS

| | | |
|---|---|---|
| 1,075,318 | 2/1960 | Germany. |
| 2,159,735 | 6/1973 | Germany. |
| 973,971 | 11/1964 | United Kingdom. |

OTHER PUBLICATIONS

Tevlina et al., Chem. Abs., 59:11, 677f (1963).
Ponomarenko et al., Chem. Abs., 75:22118v (1971).

*Primary Examiner*—John C. Bleutge
*Assistant Examiner*—T. De Benedictis, Sr.
*Attorney, Agent, or Firm*—Eugene E. Geoffrey, Jr.

[57] ABSTRACT

The method of manufacturing a cation exchanger which includes chopping up waste tires and then successively heat treating and then sulfonating the resultant product.

1 Claim, No Drawings

METHOD OF MANUFACTURING CATION EXCHANGER

This application is a continuation of application Ser. No. 482,207 filed July 24, 1974 and now abandoned.

This invention relates to an improvement in the method of manufacturing a cation exchanger from waste tires.

With the rapid increase of the number of automobiles, a severe problem has occurred in connection with the disposal of waste tires. As a way of resolving this problem, applicants herein have proposed methods of manufacturing cation exchangers from waste tires by sulfonating crushed waste tires with sulfuric acid, fuming sulfuric acid, chlorosulfonic acid, sulfuric anhydride or mixture thereof, as described in copending United States patent applications, Ser. Nos. 372,801 and 464,522 filed June 25, 1973 and Apr. 26, 1974 respectively both applications now abandoned.

This invention constitutes an improvement of the aforesaid invention and has as an object the provision of an improved method of manufacturing a cation exchanger, having a high anti-solvent stability, from waste tires.

According to this invention, the crushed waste tires are heat-treated and then sulfonated.

Now, the invention will be described in detail with reference to the following examples.

EXAMPLE 1

100 grams of waste tire (manufactured by Bridgestone Tire Co., Japan) chopped up into about 4 millimeter cubes was heated in nitrogen atmosphere at 220° C for 3 hours, and then cooled to room temperature to obtain a product of 92 grams. 20 grams of the product and 0.2 gram of silver sulfate were put into a four neck distillation flask provided with a stirrer, a reflux condenser, a thermometer and a dropping funnel. After adding 100 grams of concentrated sulfuric acid from the dropping funnel, it was reacted at 100° to 120° C for 1.5 hours and then at 170° to 200° C for 3 hours. After cooling to room temperature the reaction product was washed with deionized water and dried under reduced pressure to obtain a cation exchanger of 23 grams.

EXAMPLE 2

100 Grams of waste tire (manufactured by Yokohama Rubber Co., Japan) chopped up into about 4 millimeter cubes was heated in air at 240° C for 3 hours, and then cooled to room temperature to obtain product of 89 grams. 20 Grams of the product and 120 grams of fuming sulfuric acid containing 30% sulfric anhydride were put into the same reaction vessel as in Example 1 and reacted at 20° C for 1.5 hours, then at 50° to 60° C for 1.5 hours and thereafter at 80° to 100° C for 3 hours. The reaction product was washed with deionized water to obtain a cation exchanger of 22 grams.

EXAMPLE 3

200 Grams of waste tire (Toyo Rubber Co., Japan) crushed into particles of particle size of 16 mesh or less was intermixed with 50 grams of Nipol 2507 (trade name of styrenebutadiene latex made by Nippon Zeon Co., Japan) as binder and then formed into small balls of a diameter of about 4 millimeters. After drying at 80° C, they were heated in nitrogen atmosphere at 240° C for 3 hours and then cooled to room temperature to obtain product of 198 grams. 20 Grams of the product and 120 grams of chlorosulfonic acid were put into the same reaction vessel as in Example 1 and, while being cooled with water, reacted at 15° to 20° C for 3 hours, then at 40° to 50° C for 2 hours and further at 90° to 110° C for 2 hours. The reaction product was washed with deionized water to obtain a ball-shaped cation exchanger of 21 grams.

EXAMPLE 4

200 Grams of waste tire (manufactured by Toyo Rubber Co., Japan) crushed into powder of particle size of 60 mesh or less was heated in nitrogen atmosphere at 270° C for 1 hour to obtain a product of 182 grams. The entire product was intermixed with 200 grams of xylene solution of JSR 1502 (trade name of styrene-butadiene rubber manufactured by Japan Synthetic Rubber Co., Japan) containing 10% solids and then formed into a film of 0.4 millimeter thickness. The film was dried to obtain a second product of 202 grams. 10 Grams of the second product and 200 grams of 1,2-dichloroethane were put into the same vessel as in Example 1 and, after refreshing the vessel with nitrogen sufficiently, 20 grams of sulfuric anhydride was dropped therein with slow agitation. Thereafter the reaction was effected at 40° C for 1.5 hours. After completion of the reaction, the remaining sulfuric anhydride and dichloroethane were removed and the reaction product was washed with deionized water to obtain a film-like cation exchanger of 11 grams.

EXAMPLE 5

100 Grams of waste tire (Bridgestone Tire Co., Japan) chopped up into about 4 millimeter cubes was heated in air at 170° C for 10 hours and then cooled to room temperature to obtain a product of 93 grams. 20 Grams of the product was sulfonated under the same condition as in Example 1 to obtain a cation exchanger of 22 grams.

EXAMPLE 6

100 Grams of waste tire (Bridgestone Tire Co., Japan) chopped up into about 4 millimeter cubes was heated in nitrogen temperature to obtain product of 88 grams. 10 Grams of the product was sulfonated under the same condition as in Example 4 to obtain a cation exchanger of 12 grams.

EXAMPLE 7

The same condition as Example 1, except for the heat-treatment, was adopted to obtain the cation exchanger.

EXAMPLE 8

The same condition as Example 2 was adopted, except for the heat-treatment, to obtain the cation exchanger.

The measured ion exchanging capacities of the cation exchangers produced in these examples are as shown in the following table.

TABLE

| Example | Salt Splitting Capacity | Weakly Acidic Cation Exchanging Capacity | Total Ion Exchanging Capacity |
|---|---|---|---|
| 1 | 4.65 meq./mg. | 2.33 meq./mg. | 6.98 meq./mg. |
| 2 | 4.46 | 2.53 | 6.99 |
| 3 | 4.33 | 2.22 | 6.55 |
| 4 | 4.38 | 2.13 | 6.51 |
| 5 | 4.22 | 2.27 | 6.49 |

TABLE-continued

| Example | Salt Splitting Capacity | Weakly Acidic Cation Exchanging Capacity | Total Ion Exchanging Capacity |
|---|---|---|---|
| 6 | 4.51 | 2.49 | 7.00 |
| 7 | 3.80 | 2.56 | 6.36 |
| 8 | 3.01 | 2.52 | 5.53 |

In the above table, a significant increase in the salt splitting capacities in Examples 1 to 6, resulted from heat-treatment of this invention, and corresponding increase in the total ion exchanging capacities can be observed.

In order to investigate the anti-solvent stabilities, the resultant products of Examples 1 to 8 were immersed in various solvents. That is, 5 grams of each cation exchanger was immersed in of 100 gram baths of 1% caustic soda solution, 1% hydrochloric acid solution, methanol, hexane, toluene and acetone at 25° C and water at 60° C, respectively, for 20 days. Although the ion exchanging capabilities of the all ion exchangers were substantially maintained, some swelling or dissolution was observed in the ion exchangers of Examples 7 and 8 in the baths of caustic soda solution, methanol and water, while no significant change was observed in any of the products of Examples 1 to 6. Thus, it was confirmed that the heat-treatment of this invention has improved the anti-solvent stability and ion exchanging capability of the cation exchanger manufactured from waste tires.

The heat-treatment of this invention can be carried out either in an inert gas atmosphere, such as nitrogen or helium, or in an oxidizing atmosphere, such as air or oxygen. However, the heating temperature is preferred to be lower than 350° C in an oxidation atmosphere, while it may be 150° to 450° C, in an inert gas atmosphere.

The heat-treatment is to be carried out before the sulfonation rather than after the same, because volatile substances, such as process oils, which are contained in the waste tire and may obstruct the sulfonating reaction are removed by the heat-treatment and the succeeding sulfonation can be effected more sufficiently.

In the case of utilizing powdered tires, the powder is preferably intermixed with a binder and formed into shapes, such as small balls, before or after the heat-treatment, and then sulfonated. Preferred binders are natural rubber, styrene-butadiene rubber, butadiene-acrylonitrile rubber, polyester resin, polyvinyl chloride resin, phenol resin and the like.

We claim:

1. A method of manufacturing a cation exchanger from waste tires, comprising
   the steps of heat-treating comminuted tire stock at a temperature in the range of 150° to 450C to remove volatile materials,
   cooling and
   then sulfonating said tire particles.

* * * * *